United States Patent [19]

Johnson et al.

[11] 4,245,883
[45] Jan. 20, 1981

[54] ELECTROCHROMIC OPTICAL DEVICE

[75] Inventors: Leo F. Johnson, Bedminster; Shobha Singh, Summit; LeGrand G. Van Uitert, Morris Township, Morris County, all of N.J.

[73] Assignee: Bell Telephone Laboratories, Incorporated, Murray Hill, N.J.

[21] Appl. No.: 973,162

[22] Filed: Dec. 26, 1978

[51] Int. Cl.³ .................. G02B 5/14; G09F 9/00; G02F 1/01
[52] U.S. Cl. .................. 350/96.14; 340/783; 350/357
[58] Field of Search ............. 350/96.12, 96.13, 96.14, 350/96.29, 96.32, 96.34, 357, 363; 340/380, 783, 785, 787, 788, 995

[56] References Cited

U.S. PATENT DOCUMENTS

| | | | |
|---|---|---|---|
| 3,589,794 | 6/1971 | Marcatili | 350/96.14 |
| 3,770,339 | 11/1973 | Ramaswamy | 350/96.29 |
| 3,781,081 | 12/1973 | Rokos | 350/96.14 |
| 3,870,397 | 3/1975 | Dillon, Jr. et al. | 350/96.13 |
| 3,874,779 | 4/1975 | Thiel | 350/96.16 |
| 3,883,220 | 5/1975 | Taylor | 350/96.14 |
| 3,909,108 | 9/1975 | Taylor | 350/96.14 |
| 3,918,794 | 11/1975 | Milton | 350/96.32 |
| 3,964,819 | 6/1976 | Auracher | 350/96.14 |
| 4,013,000 | 3/1977 | Kogelnik | 350/96.14 |
| 4,026,632 | 5/1977 | Hill et al. | 350/96.14 |
| 4,027,946 | 6/1977 | Tsai | 350/96.14 |
| 4,070,092 | 1/1978 | Burns | 350/96.14 |
| 4,163,982 | 8/1979 | Domenico, Jr. et al. | 350/357 |
| 4,175,836 | 11/1979 | Redman et al. | 350/357 |

*Primary Examiner*—Stewart J. Levy
*Attorney, Agent, or Firm*—Peter A. Businger

[57] ABSTRACT

Electrically activated components such as switches, modulators, attenuators, and mode selectors are disclosed which can be used in networks of waveguides in optical communications systems. Disclosed components comprise an electrochromic medium in combination with a suitable ion source and means for producing a variable electric field across the medium. A change of color in the medium in response to variation of the electric field strength is instrumental in influencing direction and intensity of light propagating in a network.

25 Claims, 8 Drawing Figures

ELECTROCHROMIC OPTICAL DEVICE

TECHNICAL FIELD

The invention is concerned with communications systems utilizing visible or near-visible electromagnetic radiation as message carrier.

BACKGROUND OF THE INVENTION

The availability of sources of coherent electromagnetic radiation at wavelengths in the range of 0.5-5 micrometers and of waveguides for transmitting such radiation have produced widespread interest in the use of light as communications medium. Proposed optical communications systems may comprise light sources, optical waveguides, couplers between light sources and waveguides, and active components such as modulators, deflectors, and switches. Waveguides typically are of a type known as optical fibers or else are patterned transparent films on a substrate. Active components may be integrated with optical fibers as shown in U.S. Pat. No. 3,770,339 (issued Nov. 6, 1973 to V. Ramaswamy) which discloses a device for modulating the intensity of light traveling in an optical fiber by varying an electrical voltage applied to electrodes which are placed circumferentially around the fiber. Another electro-optic device suitable for use with fibers is shown in U.S. Pat. No. 3,918,794 (issued Nov. 11, 1975 to A. F. Milton) which discloses the use of liquid crystal materials for diverting light traveling in optical fibers. Additional devices intended for use with optical fibers are the mechanical and hydraulic deflectors disclosed in U.S. Pat. No. 3,874,779 (issued Apr. 1, 1975 to F. L. Thiel).

Active components have also been disclosed integral to thin film devices; e.g., U.S. Pat. Nos. 3,883,220 (issued May 13, 1975 to H. F. Taylor) and 4,070,092 (issued Jan. 24, 1978 to W. K. Burns) disclose electro-optic devices in which light travels in crystalline thin films. In response to a voltage applied to electrodes disposed on such films, a local change in refractive index is produced in the film, thereby affecting the direction of light propagating in the film.

Electrically controlled coupling of light between parallel waveguides in thin films is disclosed in U.S. Pat. Nos. 3,589,794 (issued June 29, 1971 to E. A. J. Marcatili), 3,781,081 (issued Dec. 25, 1973 to G. H. S. Rokos), 4,026,632 (issued May 31, 1977 to K. O. Hill), 3,909,108 issued Sept. 30, 1975 to (H. F. Taylor) and 3,964,819 (issued June 22, 1976 to F(F. Auracher).

In addition to electro-optic devices as referred to above, devices have been proposed for deflecting light traveling in thin films by acoustical and magnetic means. Instances for such devices are disclosed, respectively, in U.S. Pat. Nos. 4,027,946 (issued June 7, 1977 to C. S. Tsai) and 3,870,397 (issued Mar. 11, 1975 to J. F. Dillon et al). Moreover, coupling of light between thin film waveguides may be effected acoustically, magnetically, or by piezo-electrically induced mechanical motion of grating couplers as disclosed in U.S. Pat. No. 4,013,000 (issued Mar. 22, 1977 to H. W. Kogelnik).

In spite of longstanding recognition of the feasability of optical communcations as discussed, e.g., by Stewart E. Miller, "Integrated Optics: An Introduction", *Bell System Technical Journal,* Volume 48, Number 7 (September 1969) and notwithstanding the variety of components disclosed in patents cited above, the search continues for reliable, commercially viable optical components which are readily combined into integrated systems. In particular, there is a need for active components such as switches and modulators which can be integrated into systems based on light propagating in amorphous and polycrystalline waveguides. One answer to this need is disclosed below, another is disclosed in copending U.S. patent application Johnson-Singh-Van Uitert Ser. No. 973,188.

SUMMARY OF THE INVENTION

The invention is an electro-optic device which may serve, e.g., as switch, modulator, attenuator, or mode selector in optical systems based on crystalline, polycrystalline or amorphous waveguides. The device comprises an optical waveguide, a source of ions, and a body of an electrochromic material which may be placed in the light path as an electrically tuneable reflector or adjacent to the lightpath as an electrically tuneable attenuator, modulator, or mode selector. Tuning is effected by means of a reversible electric field which is placed across the body of electrochromic material and whose strength can be changed to cause transition between at least two color states of the electrochromic material.

DETAILED DESCRIPTION

The invention is based on electrochromic action, i.e., electrically induced color changes in materials such as, e.g., $WO_3$, $MoO_3$, and $V_2O_5$. Such color changes are generally understood to be the result of diffusion of ions into and out of the electrochromic material; however, the exact physical mechanism underlying the generation and annihilation of color absorption centers in electrochromic materials remains a subject of continuing investigations. For example, D. Krause et al, "Electrochromic Coatings for Reflectivity Control", *Electro-Optical Systems Design,* November 1977, page 54, describe a reaction involving simultaneous injection of equal numbers of protons and electrons into colorless $WO_3$ and yielding a blue reaction product $H_{2x}WO_3 = WO_{3-x} + xH_2O$. Also having been investigated are changes in physical properties concomitant to the color change; for example, E. K. Sichel et al, "Electrochromism in the Composite Material Au-WO₃", *Applied Physics Letters*, Volume 31, No. 2, July 15, 1977, pages 109-111, disclose a dependence of index of refraction and optical density on the color state of materials.

In accordance with the invention, bodies of an electrochromic material, in combination with optical waveguides, serve as switches, attenuators, modulators, and mode selectors. Waveguides may comprise a "core" portion which is surrounded by an auxiliary "cladding" portion whose refractive index is less than the refractive index of the core portion. The difference in refractive index between core and cladding portions may be as little as 0.1 percent and the transition between such portions may take the form, e.g., of a discrete interface, of a gradual change in refractive index, or of a number of steps approximating a gradual change. Waveguides may be completely or partially embedded in or supported by a substrate which may also serve as an optical cladding. Cladding may be absent, e.g., where a waveguide is exposed to ambient air or other lower index medium.

Devices of the invention utilize a body of an electrochromic material whose color varies between at least two states in response to an applied voltage. In the following, such two states are designated as colored and uncolored, respectively.

Figure 1:
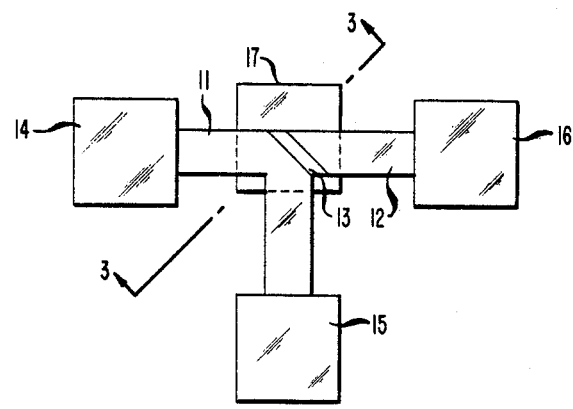
FIG. 1 schematically shows a first embodiment of an electro-optic switch utilizing a body of an electrochromic material.

FIG. 1 shows optical waveguides 11 and 12, body of electrochromic material 13, optical terminals 14, 15 and 16, and electrical contact pad 17 which partly is exposed and partly underlies electrochromic material 13. The body of electrochromic material 13 is positioned in the light path so as to have an essentially planar face at an essentially 45 degree angle with respect to the direction of light originating from terminal 14 and propagating in waveguide 11. When the body of electrochromic material 13 is in a colored state, light is primarily deflected towards terminal 15; when the body of electrochromic material 13 is in an uncolored state, light propagates primarily towards terminal 16.

Figure 2:
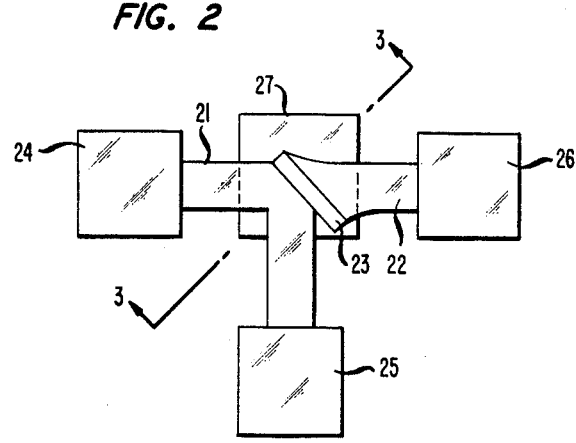
FIG. 2 schematically shows a second embodiment of an electro-optic switch utilizing a body of an electrochromic material.

FIG. 2 shows thin film optical waveguides 21 and 22, body of electrochromic material 23, terminals 24, 25 and 26, and electrical contact pad 27. Operation of the device of FIG. 2 is the same as that of the device of FIG. 1, the difference lying in enhanced efficiency of light transmission towards terminal 26 on account of the flared shape of waveguide 22.

Figure 3:
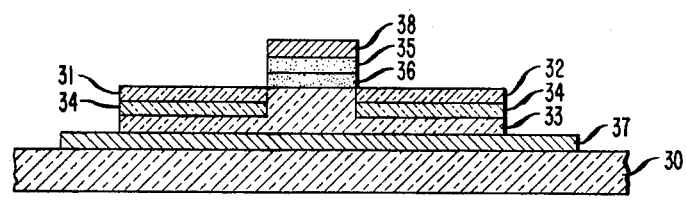
FIG. 3 is a first exemplary cross section along line 3—3 of devices shown in FIGS. 1 and 2.

FIG. 3 shows substrate 30, contact layer 37 corresponding to layers 17 and 27, mesa-shaped body of electrochromic material 33 corresponding to bodies 13 and 23, cladding layer 34, waveguiding layer 31 corresponding to layers 11 and 21, waveguiding layer 32 corresponding to layers 12 and 22, solid ion source 36, low resistance adhesive layer 35, and contact layer 38. When a suitable voltage is applied between contact layers 37 and 38 electrochromic body 33 is colored; when the voltage is reversed body 33 becomes uncolored in the mesa region. Body 33 having the shape of a mesa rising from a plate ensures mechanical integrity of the device and good electrical contact between layer 37 and body 33.

Figure 4:
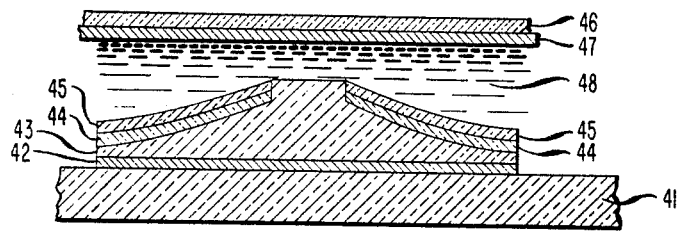
FIG. 4 is a second exemplary cross section along line 3—3 of devices shown in FIGS. 1 and 2.

FIG. 4 shows substrate 41, contact layer 42, mesa-shaped body of electrochromic material 43, cladding layer 44, waveguiding layer 45, superstrate layer 46, contact layer 47, and electrolyte 48. When a suitable voltage is applied between contact layers 42 and 47, electrochromic body 43 is colored by in-diffusion of ions from electrolyte 48; when the voltage is reversed, body 43 becomes uncolored in the mesa region as ions out-diffuse. Contact layer 47 may consist of a non-reactive semiconductor material such as e.g., doped $SnO_2$ or indium tin oxide or of the same material as electrochromic material 43 in a conducting state. For example, when a $WO_3$ electrochromic material is used, layer 47 may consist of lithium doped $WO_3$. Alternately, a compound contact layer may be formed by depositing $WO_3$ on a layer of doped $SnO_2$, indium tin oxide, or metal. Cross-sectional design according to FIG. 4 differs from design according to FIG. 3 in the use of a liquid ion source and also as to the shape of the electrochromic body. Slopes as shown in FIG. 4 may be preferable for the sake of enhanced physical integrity of devices and may also be used in devices using a solid ion source. Any of resulting cross-sectional designs may be used in either of embodiments shown in FIGS. 1 and 2.

Operation of devices shown in FIGS. 1-4 is based on variation of reflectivity at the interface between waveguide and electrochromic medium, such variation being concomitant to the color change in the medium. For example, at a wavelength of 2 micrometers and in the case of a $PbSiO_3$ waveguide and a $WO_3$ electrochromic medium placed at a 45 degree angle as shown in FIGS. 1 and 2, reflectivity at the interface is 4 percent when the electrochromic medium is uncolored, but 50 percent when it is colored. Hence, when the medium is uncolored, 96 percent of incident light is transmitted through the medium and, when it is colored, 50 percent of incident light is deflected at a 90 degree angle. In such latter case, essentially all of the remaining 50 percent of incident light are absorbed in the electrochromic medium provided its thickness is at least approximately 0.5 micrometers, whereby transmission of a spurious signal through the medium is prevented. In general, transmission of undesired signals is minimized by choosing sufficient thickness and intensity of coloring of the electrochromic medium. Deflection angles other than 90 degrees may be utilized as may be convenient in the design of integrated optical circuitry.

Figure 5:
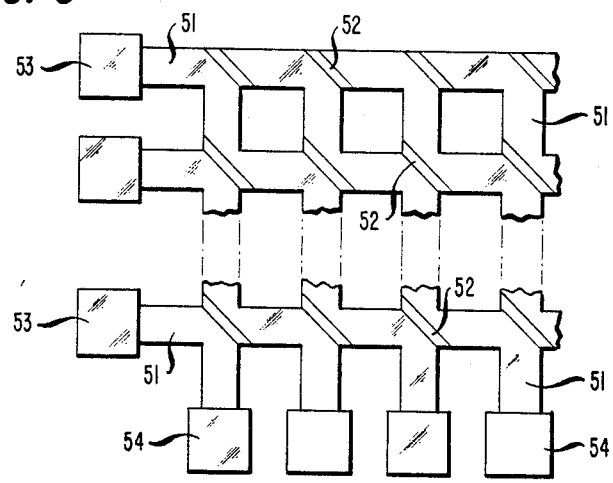
FIG. 5 schematically shows an array of electro-optic switches of a type shown in FIG. 1 and forming an electro-optic crossbar device.

FIG. 5 shows waveguides 51, bodies of elecrochromic material 52, terminals 53, and terminals 54. It can be seen that by coloring the appropriate body of electrochromic material 52, as described in connection with FIGS. 1-4, an optical path is established from any specific terminal 53 to any specific terminal 54.

Figure 6:
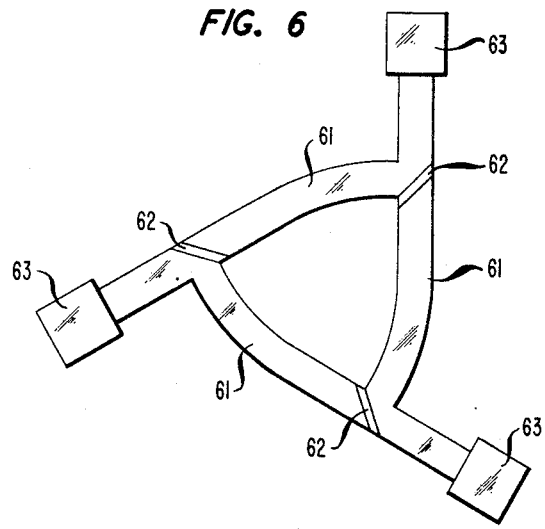
FIG. 6 schematically shows three switches of a type shown in FIG. 1 and arranged to form a fully bidirectional network.

FIG. 6 shows waveguides 61, bodies of electrochromic material 62, and terminals 63. Waveguides 61 are arranged so as to meet at angles of 90 degrees to permit faces of bodies 62 to be positioned essentially at a 45 degree angle relative to the direction of light traveling in waveguides 61. It can be seen that by coloring the appropriate body 62 as discussed in connection with FIGS. 1-4, and leaving the remaining two uncolored, a bi-directional optical path is established between any two terminals 63.

Figure 7:
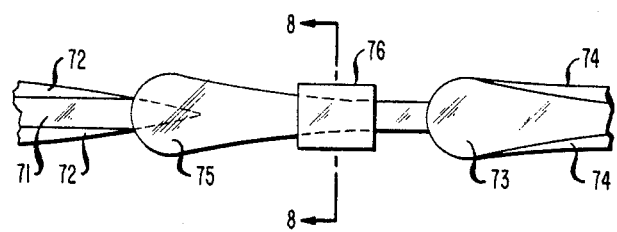
FIG. 7 schematically shows an attenuator and mode selecting device utilizing a body of an electrochromic material.
Figure 8:
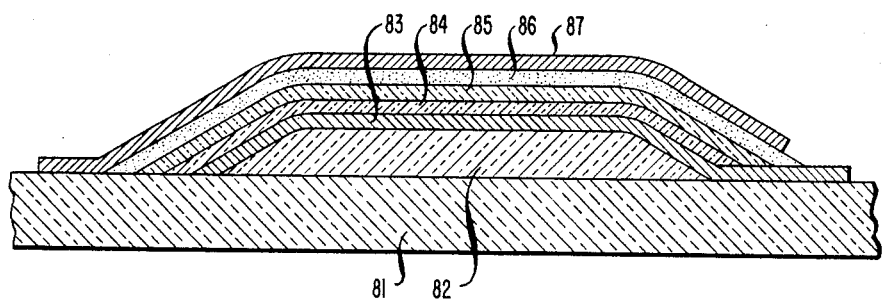
FIG. 8 shows a cross section along line 8—8 of the device shown in FIG. 7.

FIGS. 7 and 8 depict a device which may serve as attenuator, modulator, or mode selector based on electrically controlled absorption of an evanescent field. Specifically, FIG. 7 shows waveguiding layers 71 and 73, cladding layers 72 and 74, waveguiding layer 75, and electro-optic attenuator 76.

FIG. 8 shows substrate 81, waveguiding layer 82, electrode layer 83, electrochromic layer 84, ion source layer 85, adhesive layer 86, and electrode layer 87. Depending on the degree of coloring of electrochromic layer 84, a controlled amount of electromagnetic energy of light traveling in waveguide 82 is transformed into heat, an effect which results in controlled attenuation or modulation of light. Moreover, since different modes of radiation are affected to different degrees, the device may also serve as a mode selector. Cross-sectional design shown in FIG. 8 may be deviated from and simplified when the waveguiding layer consists of a conducting or semiconducting material such as, e.g., GaAlAs. Contact layer 83 is not required in this case and the electrochromic layer may be deposited directly on the GaAlAs waveguide. This simplified structure may be particularly suited when a III-V semiconductor laser such as, e.g., a GaAlAs or InGaAsP laser is used in optical communications.

Operation of devices shown in FIGS. 7 and 8 is based on the facts that a small portion of the electromagnetic field associated with radiation propagating in a core-cladding structure extends into the cladding layer and that radiation is attenuated depending on the degree of absorption in such layer. Since absorption in an electrochromic medium directly depends on the degree of coloring of the medium, such medium, when used as a cladding material, can act as a variable attenuator. For example, at a wavelength of 1 micrometer and for well-guided modes in a gallium aluminum arsenide waveguide and a moderately colored $WO_3$ cladding, attenuation is approximately 75 percent for a 1 mm guide length and approximately 99.9999 percent for a 1 cm guide length.

In some semiconductor applications it may be desirable not to deposit the electrochromic medium directly on the waveguiding layer but to interpose an additional cladding layer betwen the waveguiding layer and the electrochromic medium. For example, a low index gallium aluminum arsenide layer may serve as a cladding on a higher index gallium aluminum arsenide light guiding layer. When a $WO_3$ electrochromic layer is deposited on th cladding layer, the cladding layer acts as a buffer reducing the range of achievable attenuation, attenuation being inversely exponentially dependent on buffer layer thickness. To prevent undue attenuation of the evanescent field in such buffer layer, its thickness should be kept as small as possible and preferably not exceeding 0.3 micrometer.

Devices of the invention may be conveniently fabricated utilizing techniques such as photolithographical masking, chemical vapor deposition, and ion beam techniques as disclosed by E. G. Spencer and P. H. Schmidt, "Ion Beam Techniques for Device Fabrication", *Journal of Vacuum Science and Technology*, Vol. 8, No. 5, pages S52-S70. The following examples serve to illustrate application of such techniques in the manufacture of devices of the invention.

EXAMPLE 1

Fabrication of a switch as shown in FIGS. 1 and 2 and having a cross section as shown in FIG. 3 is as follows: Conducting film 37 of indium tin oxide is deposited by sputtering onto substrate 30 which consists of fused silica. A part of contacts 17, 27, or 37 is masked off with a photolithographic mask material and a layer of $WO_3$ is deposited by evaporation. Thickness of such layer of $WO_3$ is approximately 2 micrometers. By covering the deposited layer of $WO_3$ with a solution of lithium perchlorate in propylene carbonate and applying a voltage between the solution and the indium tin oxide contact, the layer is turned dark blue, in which state it is a good electrical conductor. The mesa structure shown in FIG. 3 is produced by ion milling while areas 13 or 23 of the $WO_3$ layer are covered with a mask and until the thickness of the exposed portion of the $WO_3$ layer is reduced to approximately 1 micrometer. A 0.5 micrometer layer of $SiO_2$ is deposited over the milled areas by combined sputter deposition and ion milling to ensure an even fill, followed by a 0.5 micrometer layer of $PbSiO_3$ glass by the same technique. In combination with a low index cover of air or $SiO_2$, such structure is effective as a light guiding structure, silica having a refractive index of $n=1.4585$ and $PbSiO_3$ having a substantially greater refractive index of approximately $n=2.0$. The light guiding pattern is now masked and etched out in the $PbSiO_3$ layer using a solution of hydrochloric acid. The mask is stripped and a new mask is applied for the deposition of an ion source layer of LiF, an adhesive layer of $PbF_2$, and a gold contact layer.

EXAMPLE 2

Fabrication of switches of a type shown in FIGS. 1 and 2 and having a cross section as shown in FIG. 4 proceeds as follows: A conducting film of indium tin oxide is deposited by evaporation on a substrate of polished $SiO_2$. The area of the contact electrode is covered with a photolithographic mask, the unmasked portion is etched away by exposure to an etchant, and the mask is stripped. A layer of $WO_3$ is evaporated and etched so as to produce sloping approaches to a mesa. Layers of $SiO_2$ and $PbSiO_3$ are deposited as described in Example 1. Fabrication of this device is completed by providing a covering superstrate 46 on which an electrically conducting contact layer 47 has been deposited. The space between such layer 46 waveguiding layer 45 is filled with an electrolyte such as, e.g., a dilute aqueous solution of sulfuric acid or a solution of LiCl, LiBr or other lithium salt in dimethyl sulfoxide, propylene carbonate, dimethyl formamide, or other organic solvent.

EXAMPLE 3

Fabrication of an attenuator suitable for light transmission at wavelengths in the range of 1-4 micrometers and having a structure as shown in FIGS. 7 and 8 is as follows: A 1 micrometer thick layer of $As_2Se_3$ glass waveguide 75 having a refractive index of 2.84 at 4 micrometers is deposited on a silica substrate ($n=1.46$) and overlapping tapered waveguide 71 which has a refractive index greater than 1.46. Waveguide 73 also has a refractive index greater than 1.46 and is deposited overlapping tapered waveguide 75. Silica claddings 72 and 74 are now deposited over waveguides 71 and 73. A mask is applied which leaves area 76 uncovered, and a 0.02 micrometer contact layer of indium tin oxide ($n=2.0$) is deposited by evaporation. A portion of the indium tin oxide layer is covered with a second mask and a 0.1 micrometer thick layer of $WO_3$ ($n=2.5$) and a 0.01 micrometer thick layer of $PbF_2$ ($n=1.7$) are deposited by evaporation. A third mask is applied to cover a portion of the deposited layer of $PbF_2$ adjacent to the indium tin contact and a 0.2 micrometer thick layer of gold contact layer 87 is evaporated. After stripping of the mask, contact may be made to layers 83 and 87.

EXAMPLE 4

Techniques of deposition and patterning as described in Example 3 are used in the fabrication of a tunable attenuator suitable for wavelengths in the range of 0.8-15 micrometers, and having the following structure: A GaAs substrate ($n=3.6$) which also serves as a contact, a $GaAl_xAs_{1-x}$ cladding layer ($x=0.29$, $n=3.4$), a GaAl$_y$As$_{1-y}$ waveguide ($y=0.13$, $n=3.5$), a WO$_3$ cladding layer ($n=2.2$), a LiF.xH$_2$O ion source ($n=1.392$), and a gold contact layer.

EXAMPLE 5

The following structure is effective as a tunable attenuator: A silica substrate ($n=1.46$), an As$_2$Se$_3$ waveguide ($n=2.8$), a 0.1 micrometer layer of indium tin oxide ($n=2.0$), a 0.1 micrometer thick layer of WO$_3$ ($n=2.2$) a 0.3 micrometer thick layer of LiF ($n=1.4$), a 0.05 micrometer thick layer of PbF$_2$, and a gold contact layer.

We claim:

1. Electro-optical switch comprising (1) a first and a second optical waveguide, said first waveguide forming a light path which changes direction from a first direction to a second direction, said second waveguide being aligned with said first waveguide in said first direction (2) a body of an electrochromic medium in contact with said first and said second waveguide, the interface between said first waveguide and said body being essentially planar and bisecting the angle between said first direction and said second direction, (3) a source of ions in contact with at least portion of the surface of said body, and (4) means for producing an electric field across said body.

2. Electro-optical device comprising at least a first substrate-supported optical waveguide, a source of light, and means for electrically controlling said light characterized in that said means comprises (1) a body of an electrochromic medium which is in proximity to said first waveguide and which, when exposed to an electrical field having a first value is in a first state here designated an uncolored state and, when exposed to an electrical field having a second value is in a second state here designated a colored state, (2) an ion source in contact with at least a portion of the surface of said body and, (3) means for producing an electrical field across said body.

3. Device of claim 2 in which said field is produced by a voltage applied to electrodes positioned on opposite sides of said body.

4. Device of claim 2 in which the material of said electrochromic medium is selected from the group consisting of WO$_3$, MoO$_3$, and V$_3$O$_5$.

5. Device of claim 2 comprising a second waveguide, said first waveguide forming a light path which changes direction from a first direction to a second direction, said second waveguide being aligned with said first waveguide in said first direction, said body of electrochromic medium being in contact with said first waveguide and said second waveguide, and the interface between said first waveguide and said body of an electrochromic medium being essentially planar and bisecting the angle between said first direction and said second direction.

6. Device of claim 5 in which the angle between said first direction and said second direction is essentially 90 degrees.

7. Device of claim 5 in which said body in said colored state absorbs essentially the entire portion of said light which is not reflected by said body.

8. Device of claim 5 in which said second waveguide has a flared shape at the interface between said second waveguide and said body of electrochromic material.

9. Device of claim 5 comprising a plurality of waveguides, sources of light, and means for controlling said light disposed to form an optical crossbar device.

10. Device of claim 5 comprising three light sources, couplers, and means for controlling said light disposed to form a fully bidirectional optical network having at least three terminals.

11. Device of claim 2 in which said body of electrochromic material is disposed alongside said waveguide.

12. Electro-optical switching network comprising a plurality of substrate-supported optical waveguides characterized in that said network comprises (1) at least one body of an electrochromic medium which is in proximity of at least one of said waveguides and which, when exposed to an electrical field having a first value is in a first state here designated an uncolored state and, when exposed to an electrical field having a second value is in a second state here designated a colored state, (2) an ion source in contact with at least a portion of the surface of said body, and (3) means for producing an electrical field across said body.

13. Network of claim 12 in which said field is produced by a voltage applied to electrodes positioned on opposite sides of said body.

14. Network of claim 12 in which the material of said electrochromic medium is selected from the group consisting of WO$_3$, MoO$_3$, and V$_2$O$_5$.

15. Network of claim 12 in which said plurality comprises a first waveguide and a second waveguide, said first waveguide forming a light path which changes direction from a first direction to a second direction, said second waveguide being aligned with said first waveguide in said first direction, said body of an electrochromic medium being in contact with said first waveguide and said second waveguide, and the interface between said first waveguide and said body of an electrochromic medium being essentially planar and bisecting the angle between said first direction and said second direction.

16. Network of claim 15 in which the angle between said first direction and said second direction is essentially 90 degrees.

17. Network of claim 15 in which said body in said colored state absorbs essentially the entire portion of said light which is not reflected by said body.

18. Network of claim 15 in which said second waveguide has a flared shape at the interface between said second waveguide and said body.

19. Network of claim 15 in which said plurality of waveguides forms an optical crossbar device.

20. Network of claim 15 comprising three means for controlling said light disposed to form a fully bidirectional optical network having at least three terminals.

21. Network of claim 12 in which said body is disposed alongside said waveguide.

22. Electro-optical device comprising a substrate-supported optical waveguide, a body of an electrochromic medium in proximity of said waveguide, a source of ions in contact with at least a portion of the surface of said body, and means for producing an electric field across said body.

23. Device of claim 22 in which said means is an attenuating means.

24. Device of claim 22 in which said means is a modulating means.

25. Device of claim 22 in which said means is a mode selecting means.

* * * * *